(12) United States Patent
Chajdas et al.

(10) Patent No.: US 12,293,456 B2
(45) Date of Patent: *May 6, 2025

(54) OVERLAY TREES FOR RAY TRACING

(71) Applicant: Advanced Micro Devices, Inc., Santa Clara, CA (US)

(72) Inventors: Matthäus G. Chajdas, Munich (DE); Konstantin I. Shkurko, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,927

(22) Filed: Nov. 10, 2023

(65) Prior Publication Data
US 2024/0087223 A1     Mar. 14, 2024

Related U.S. Application Data

(63) Continuation of application No. 17/553,669, filed on Dec. 16, 2021, now Pat. No. 11,816,792.

(51) Int. Cl.
*G06T 17/00*     (2006.01)
*G06T 15/06*     (2011.01)

(52) U.S. Cl.
CPC ............ *G06T 17/005* (2013.01); *G06T 15/06* (2013.01)

(58) Field of Classification Search
None
See application file for complete search history.

(56) References Cited

U.S. PATENT DOCUMENTS

| | | | |
|---|---|---|---|
| 8,823,736 B2 * | 9/2014 | Barringer | G06T 17/005 345/418 |
| 2016/0093090 A1 * | 3/2016 | Shin | G06T 17/005 345/419 |
| 2017/0116277 A1 | 4/2017 | Shin et al. | |
| 2017/0116774 A1 * | 4/2017 | Shin | G06T 15/50 |

* cited by examiner

*Primary Examiner* — Nurun Flora
(74) *Attorney, Agent, or Firm* — Volpe Koenig

(57) ABSTRACT

A method and a processing device for performing rendering are disclosed. The method comprises generating a base hierarchy tree comprising data representing a first object and generating a second hierarchy tree representing a second object comprising shared data of the base hierarchy tree and the second hierarchy tree and difference data. The method further comprises storing the difference data in the memory without storing the shared data, and generating an overlay hierarchy tree comprising the shared data, the difference data, and indication information indicating nodes of the overlay hierarchy tree that comprise the difference data. The method further comprises rendering the first object using the data stored for the base hierarchy tree, and rendering the second object using any one or a combination of the shared data, the difference data, and the indication information.

20 Claims, 7 Drawing Sheets

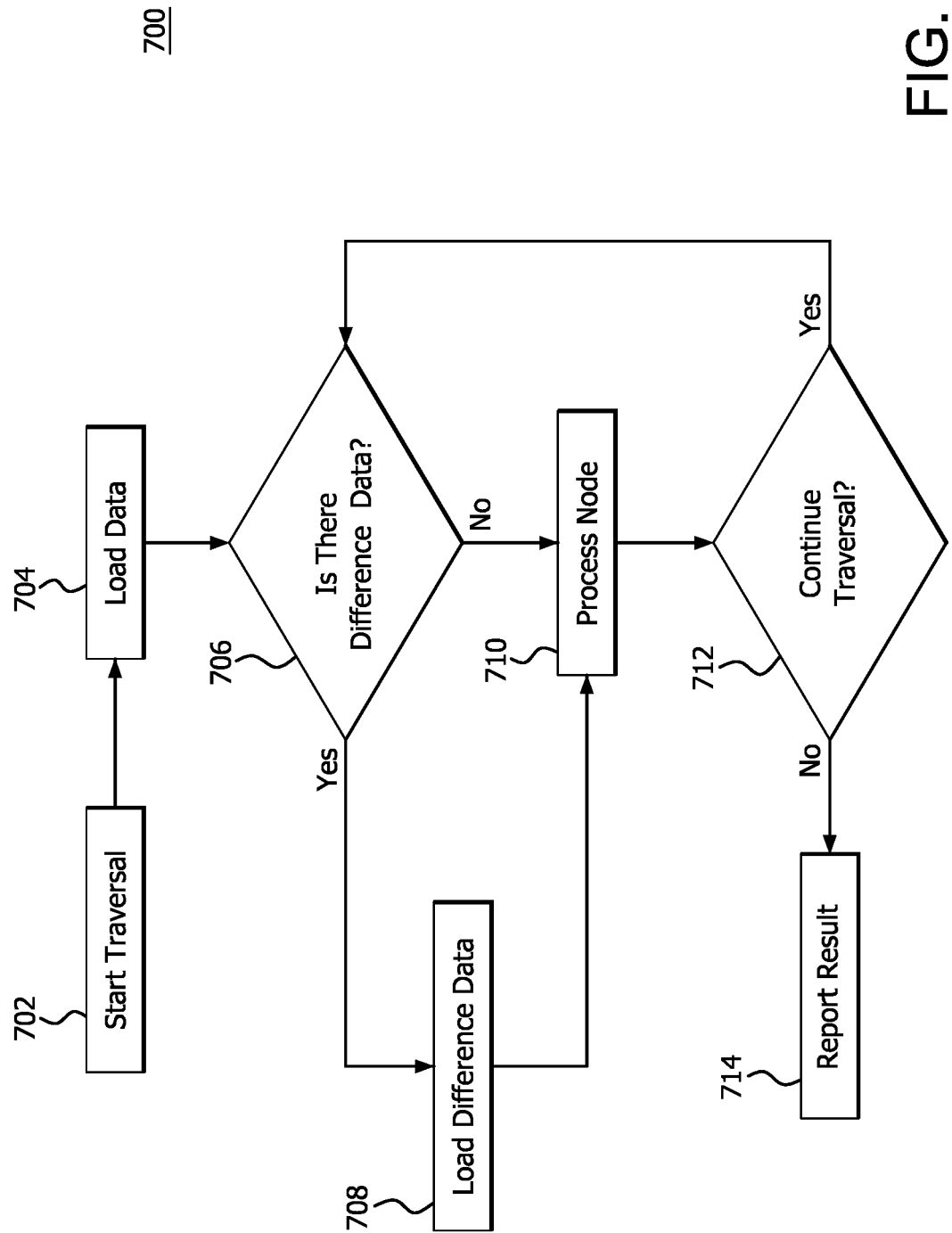

OVERLAY TREES FOR RAY TRACING

CROSS REFERENCE TO RELATED APPLICATIONS

This application is a continuation of U.S. patent application Ser. No. 17/553,669, filed on Dec. 16, 2021, which is incorporated by reference as if fully set forth herein.

BACKGROUND

Ray tracing is a type of graphics rendering technique in which simulated rays of light are cast to test for object intersection and pixels are illuminated and colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein:

FIG. 7 is a flow diagram illustrating an example method 700 of traversing an overlay tree according to features of the disclosure.

DETAILED DESCRIPTION

Figure 1:
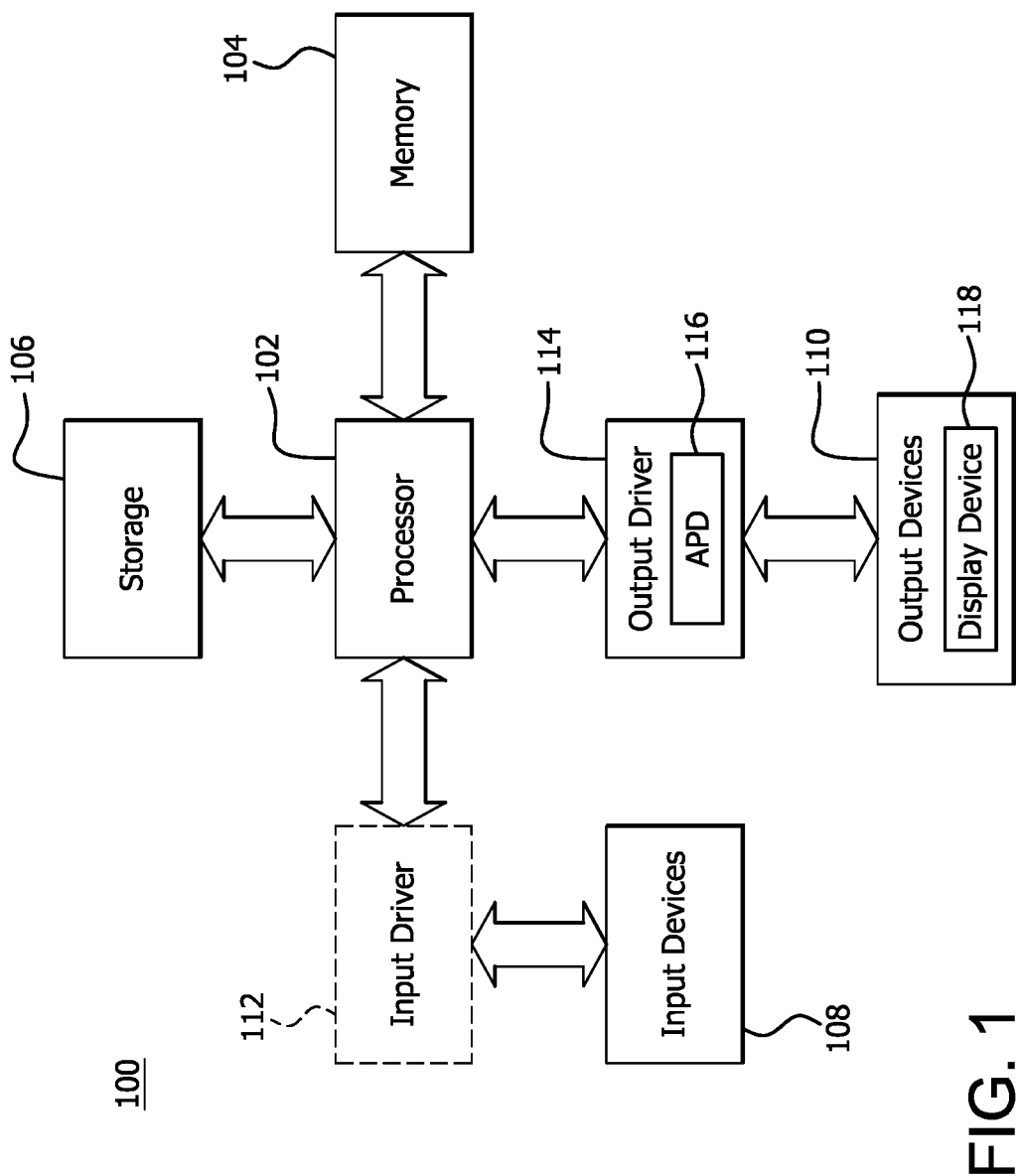
FIG. 1 is a block diagram of an example device in which one or more features of the disclosure can be implemented.

Typically, a scene (e.g., objects in a scene) is represented by a large number of geometric shapes (i.e., polygons). For simplified explanation purposes, in examples described herein, the geometric shapes used to represent a scene are described as triangles. Features of the present disclosure can be implemented, however, using any geometric shape to represent objects in a scene.

Ray tracing renders a three dimensional (3D) scene by casting (i.e. shooting) a simulated light ray from a point of origin in a 3D space of a scene and testing whether the ray intersects an object (e.g., a triangle representing a portion of an object) in a scene. Ray tracing can be used to determine the presence of objects and a variety of characteristics of objects in a scene, such as for example, the distance between an intersection and a point of origin (e.g., the distance between an object and the point of origin), the location (in a 3D space) of objects in a scene, the physical characteristics (e.g., size, shape, luminance and color) of objects in a scene, and whether light is being obstructed (e.g., a first object, located between a second object and a light source, casts a shadow on the second object).

Separate rays can be cast on each triangle in a scene to determine the presence and characteristics of objects. However, each ray intersection test is complex and expensive in terms of processing resources. Accordingly, acceleration structures (e.g., bounding volume hierarchy) are used to implement ray tracing more efficiently to make accurate determinations.

For example, as described in further detail herein, in a bounding volume hierarchy accelerated structure, numbers of triangles are grouped together (e.g., by a bounding box) and multiple hierarchies (i.e., hierarchy levels) of triangles are created. The bounding volume hierarchy data structure allows the number of ray-triangle intersections to be reduced as compared with a scenario in which no such data structure were used and therefore all triangles in a scene would have to be tested against the ray. Specifically, if a ray does not intersect a particular bounding box, and that bounding box bounds a large number of triangles, then each triangle in that box can be eliminated from the test. Thus, a ray intersection test is performed as a sequence of tests of the ray against axis-aligned bounding boxes, followed by tests against triangles.

In a simplified example, if 4 triangles are grouped together for testing, a hierarchy tree can be created which includes 3 separate hierarchical levels. In this example, the first level includes the group of 4 triangles. The second level includes 2 separate groups of 2 triangles branched off of the group of 4 triangles, with 1 group represented by 2 of the 4 triangles and the other group represented by the 2 other triangles. The third level includes the 4 individual triangles, with the first and second triangles branching off of the first group of triangles in the second level and the third and fourth triangles branching off of the second group of triangles in the second level. A ray is first tested (e.g., cast) between a point of origin (e.g., in a 3D space) and the group of 4 triangles (i.e., the first level). When there is no hit (i.e., no object detected), then no further ray tracing is performed on the group of 4 triangles by intersecting the bounding box of those 4 triangles. When there is a hit (i.e., an object is detected), the testing proceeds to the second level. The first group in the second level is then tested. If there is a hit on the first group in the second level, traversal continues to the third level and the process repeats. When a hit occurs on one of the nodes (e.g., a triangle) in the third level, then traversal is either aborted or continues to other nodes in which an object is detected. For example, traversal is aborted when an occluded mode is used. Alternatively, traversal continues to other nodes in which an object is detected (e.g., if a ray hits both the first and second group) when a closest hit mode is used.

Accordingly, a determination of which triangles represent an object is made without testing the second group of triangles in the second level or the third and fourth triangles in the third level. In this example, the determination is made using 4 tests (i.e., 2 ray/box tests and 2 ray/triangle tests) for 4 triangles. However, as can be appreciated, when a larger group of triangles is tested using a bounding volume hierarchy, many more groups of triangles may be eliminated from testing. Accordingly, as the number of triangles in a testing region increases, a bounding volume hierarchy reduces the total number of tests to be performed for the region (e.g., 10 tests for 1000 triangles) and ray tracing is implemented more efficiently while maintaining accuracy.

When two objects in a scene are different, a first hierarchy tree representing the first object and a second hierarchy tree representing the second object are built and the data for each of the nodes is stored and later used to render the objects at runtime. If two objects in a scene are the same, the same hierarchy tree can be reused to represent both objects, avoiding the time and power consumed to create a new tree for the second object. In some cases, however, two objects in a scene can be similar but different (e.g., visually similar but visually different). For example, an object can visually change (e.g., a portion of the object is removed, a portion of the object is altered, a new portion is added to the object) as the scene progresses (e.g., from one image to the next), resulting in the object being treated as two similar, but different objects. Alternatively two objects in the same image can be visually similar, but different.

In conventional ray tracing techniques, when two objects in a scene are similar but different, the objects are treated as different objects such that the data for each node in a second bounding volume hierarchy tree is built (i.e., created) which includes storing for the groups of triangles (i.e., nodes) and individual triangles representing the structure shared by both objects (i.e., shared data) as well as the data for the nodes and triangles not shared by both objects (i.e., difference data), despite that the shared data was previously stored in memory during the building of a base tree hierarchy tree for the first object.

Feature of the present disclosure provide devices and methods for efficiently performing a ray tracing procedure. Features of the present disclosure provide efficient ray tracing techniques, using bounding volume hierarchy trees, for similar but different objects. Features of the present disclosure determine the shared data (i.e., the same data representing the same structure) and difference data (i.e., data representing different structures) between a base hierarchy tree (i.e., representing a first object) and a second tree (i.e., representing a second similar but different object). The data representing each node of the first tree is stored. The difference data of the nodes in the second tree is stored, but the shared data previously stored for the base tree is not stored for the second tree, avoiding additional time and power consumption.

The base tree and the second tree are overlaid and information (e.g., a single bit) indicating the nodes where the difference data occurs is stored in memory. Information is stored at a parent node of one or more child nodes which include difference data. When traversing the second tree to render the second object, the memory for the shared data is saved as the original data is referenced where possible.

A method for using ray tracing to render similar but different objects in a scene is provided which comprises traversing nodes of a base hierarchy tree comprising data representing a first object in the scene, rendering the first object using the data of the base hierarchy tree, and traversing nodes of an overlay hierarchy tree. The overlay hierarchy tree comprises shared data of the base hierarchy tree and a second hierarchy tree representing a second object in the scene, difference data representing a difference between the first object and the second object and indication information which indicates nodes of the overlay tree comprising the difference data. The second object is rendered using the overlay hierarchy tree.

A method for using ray tracing to render similar but different objects in a scene is provided which comprises generating a base hierarchy tree comprising data representing a first object in the scene, storing the data representing the first object in the scene and generating a second hierarchy tree. The second hierarchy tree comprises shared data of the base hierarchy tree and the second hierarchy tree and difference data representing a difference between the first object and the second object. The method also includes storing the difference data without storing the shared data and generating an overlay tree which comprises the shared data, the difference data and indication information which indicates nodes of the overlay tree that comprise the difference data.

A processing device is provided which comprises memory and a processor. The processor is configured to traverse nodes of a base hierarchy tree comprising data representing a first object in the scene, render the first object using the data of the base hierarchy tree, and traverse nodes of an overlay hierarchy tree. The overlay hierarchy tree comprises shared data of the base hierarchy tree and a second hierarchy tree representing a second object in the scene, difference data representing a difference between the first object and the second object and indication information which indicates nodes of the overlay tree comprising the difference data. The second object is rendered the using the overlay hierarchy tree.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
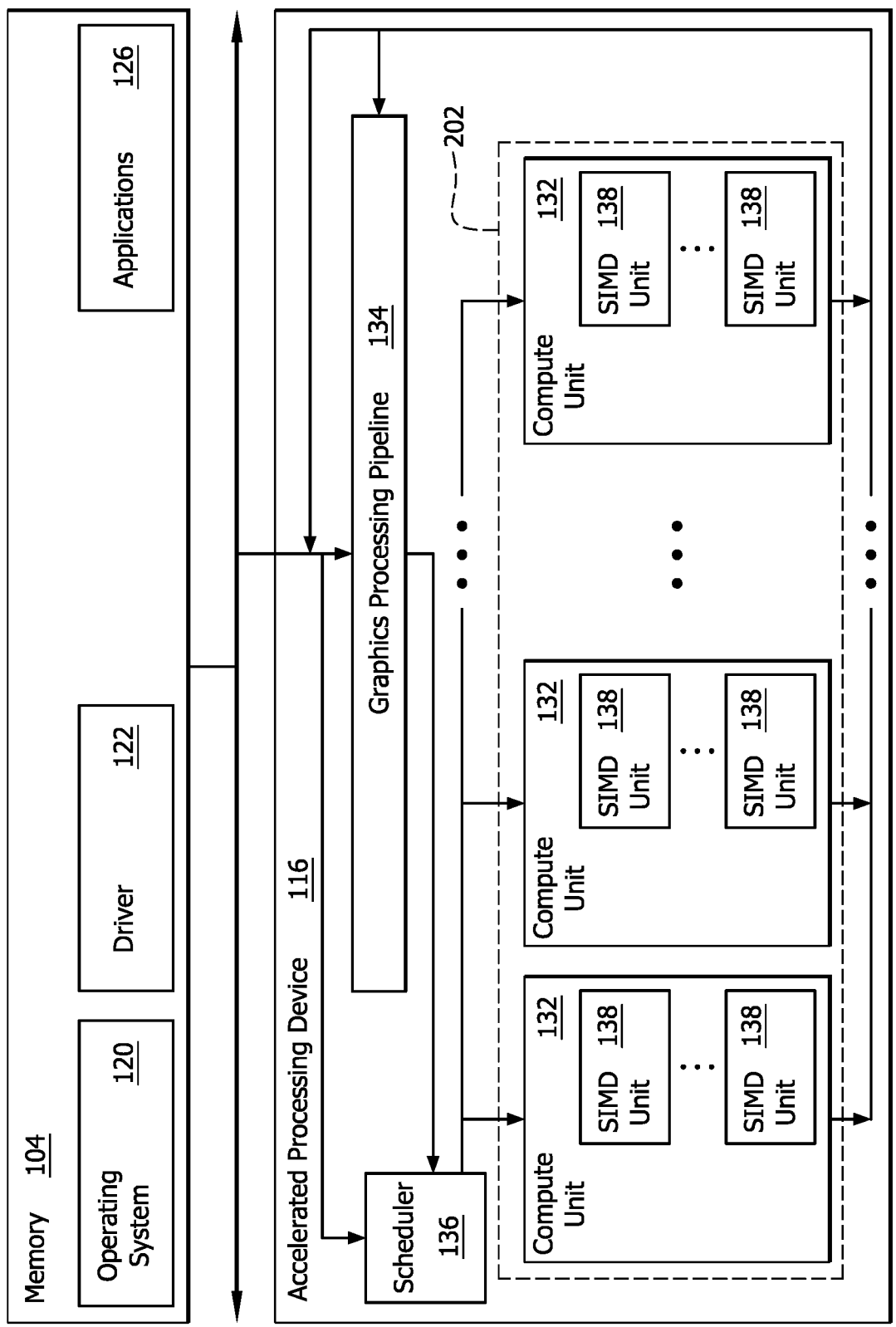
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (collectively "compute units 202") that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" (also "waves") on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
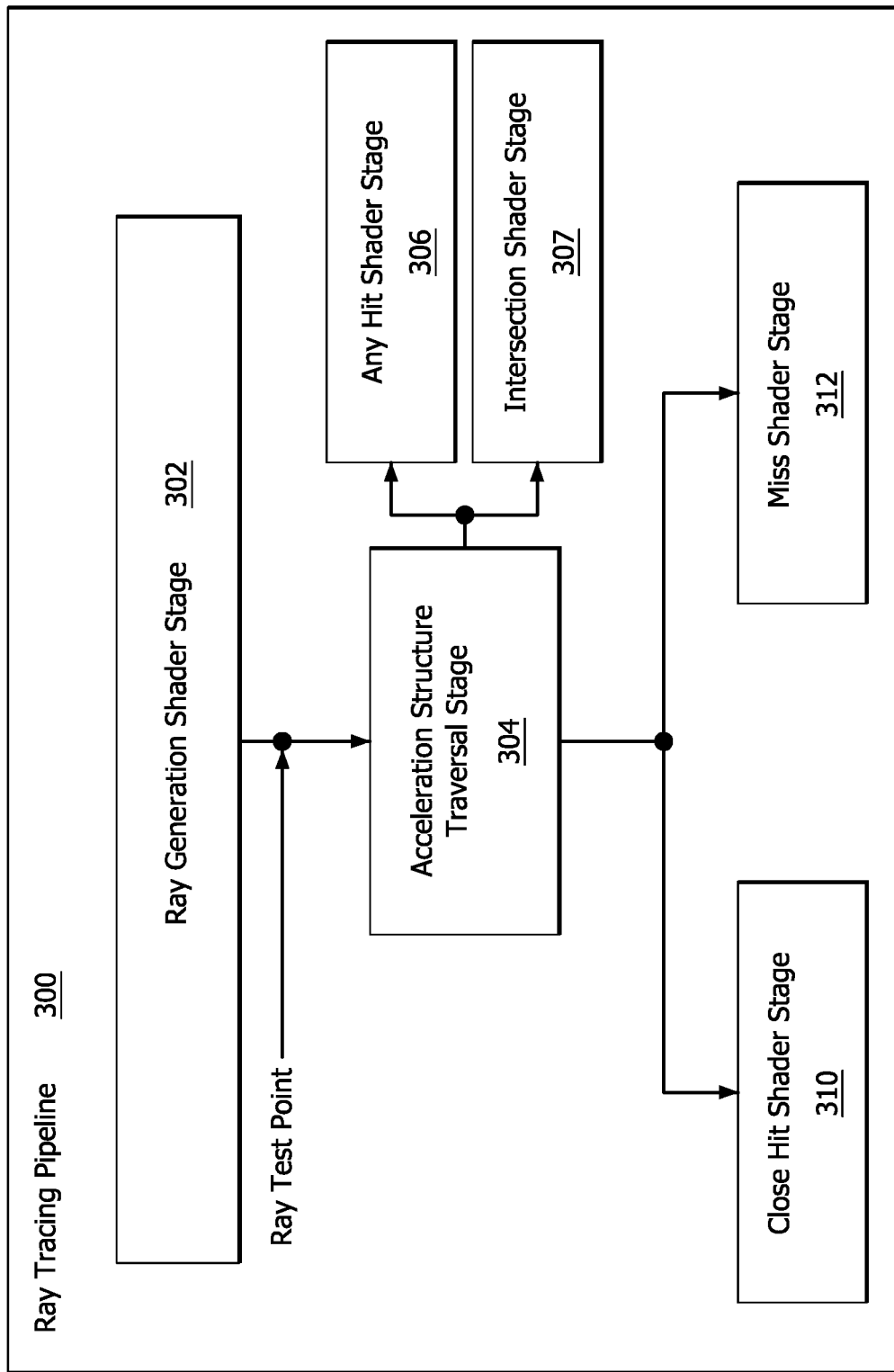
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, intersection shader 307, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs the ray intersection test to determine whether a ray hits a triangle. The other programmable shader stages (ray generation shader 302, any hit shader 306, closest hit shader 310, miss shader 312) are implemented as shader programs that execute on the SIMD units 138. The acceleration structure traversal stage is implemented in software (e.g., as a shader program executing on the SIMD units 138), in hardware, or as a combination of hardware and software. The ray tracing pipeline 300 may be orchestrated partially or fully in software or partially or fully in hardware, and may be orchestrated by the processor 102, the scheduler 136, by a combination thereof, or partially or fully by any other hardware and/or software unit. In examples, traversal through the ray tracing pipeline 300 is performed partially or fully by the scheduler 136, either autonomously or under control of the processor 102, or partially or fully by a shader program (such as a bounding volume hierarchy traversal shader program) executing on one or more of the SIMD units 138. In some examples, testing a ray against boxes and triangles (inside the acceleration structure traversal stage 304) is hardware accelerated (meaning that a fixed function hardware unit performs the steps for those tests). In other examples, such testing is performed by software such as a shader program executing on one or more SIMD units 138. Herein, where the phrase "the ray tracing pipeline does [a thing]" is used, this means that the hardware and/or software that implements the ray tracing pipeline 300 does that thing.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects within the scene, and tests the ray against triangles in the scene. During this traversal, for triangles that are intersected by the ray, the ray tracing pipeline 300 triggers execution of an any hit shader 306 and/or an intersection shader 307 if those shaders are specified by the material of the intersected triangle. Note that multiple triangles can be intersected by a single ray. It is not guaranteed that the acceleration structure traversal stage will traverse the acceleration structure in the order from closest-to-ray-origin to farthest-from-ray-origin. The acceleration structure traversal stage 304 triggers execution of a closest hit shader 310 for the triangle closest to the origin of the ray that the ray hits, or, if no triangles were hit, triggers a miss shader.

Note, it is possible for the any hit shader 306 or intersection shader 307 to "reject" an intersection from the acceleration structure traversal stage 304, and thus the acceleration structure traversal stage 304 triggers execution of the miss shader 312 if no intersections are found to occur with the ray or if one or more intersections are found but are all rejected by the any hit shader 306 and/or intersection shader 307. An example circumstance in which an any hit shader 306 may "reject" a hit is when at least a portion of a triangle that the acceleration structure traversal stage 304 reports as being hit is fully transparent. Because the acceleration structure traversal stage 304 only tests geometry, and not transparency, the any hit shader 306 that is invoked due to an intersection with a triangle having at least some transparency may determine that the reported intersection should not count as a hit due to "intersecting" a transparent portion of the triangle. A typical use for the closest hit shader 310 is to color a ray based on a texture for the material. A typical use for the miss shader 312 is to color a ray with a color set by a skybox. It should be understood that the shader programs defined for the closest hit shader 310 and miss shader 312 may implement a wide variety of techniques for coloring ray and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, intersection shader 307, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray intersects an object is referred to herein as a "ray intersection test." The ray intersection test involves shooting a ray from an origin and determining whether the ray intersects a triangle and, if so, what distance from the origin the triangle intersection is at. For efficiency, the ray tracing test uses a representation of space referred to as a bounding volume hierarchy. This bounding volume hierarchy is the "acceleration structure" referred to elsewhere herein. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle or other geometry against which a ray intersection test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
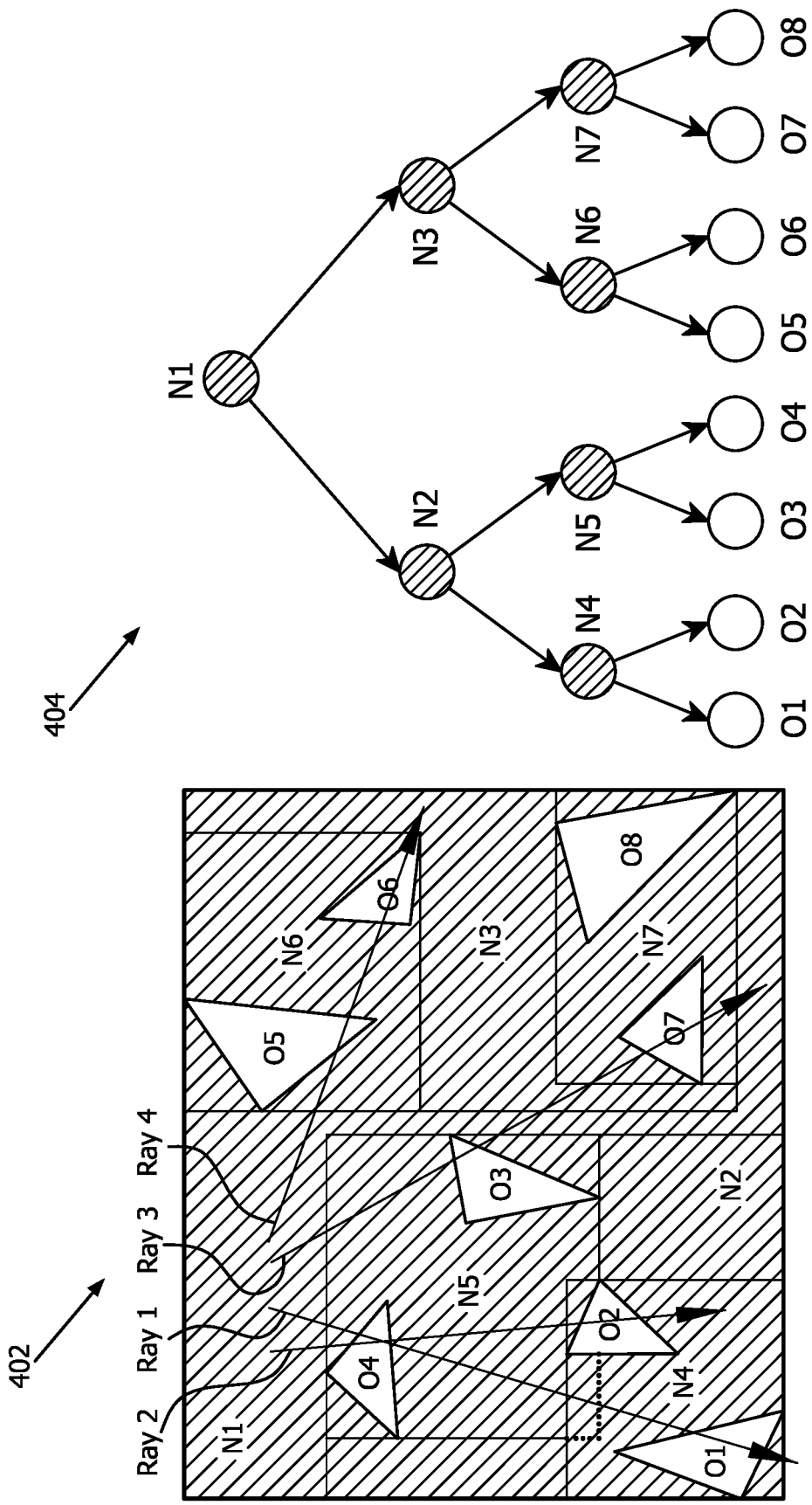
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the test for that non-leaf node fails. In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

The ray tracing pipeline 300 casts rays to detect whether the rays hit triangles and how such hits should be shaded. Each triangle is assigned a material, which specifies which closest hit shader should be executed for that triangle at the closest hit shader stage 310, as well as whether an any hit shader should be executed at the any hit shader stage 306, whether an intersection shader should be executed at the intersection shader stage 307, and the specific any hit shader and intersection shader to execute at those stages if those shaders are to be executed.

Thus, in shooting a ray, the ray tracing pipeline 300 evaluates intersections detected at the acceleration structure traversal stage 304 as follows. If a ray is determined to intersect a triangle, then if the material for that triangle has at least an any hit shader or an intersection shader, the ray tracing pipeline 300 runs the intersection shader and/or any hit shader to determine whether the intersection should be deemed a hit or a miss. If neither an any hit shader or an intersection shader is specified for a particular material, then an intersection reported by the acceleration structure traversal 304 with a triangle having that material is deemed to be a hit.

Some examples of situations where an any hit shader or intersection shader do not count intersections as hits are now provided. In one example, if alpha is 0, meaning fully transparent, at the point that the ray intersects the triangle, then the any hit shader deems such an intersection to not be a hit. In another example, an any hit shader determines that the point that the ray intersects the triangle is deemed to be at a "cutout" portion of the triangle (where a cutout "cuts out" portions of a triangle by designating those portions as portions that a ray cannot hit), and therefore deems that intersection to not be a hit.

Once the acceleration structure has been fully traversed, the ray tracing pipeline 300 runs the closest hit shader 310 on the closest triangle determined to hit the ray. As with the any hit shader 306 and the intersection shader 307, the closest hit shader 310 to be run for a particular triangle is dependent on the material assigned to that triangle.

In sum, the ray tracing pipeline 300 traverses the acceleration structure 304, determining which triangle is the closest hit for a given ray. The any hit shaders and intersection shaders evaluate intersections—potential hits—to determine if those intersections should be counted as actual hits. Then, for the closest triangle whose intersection is counted as an actual hit, the ray tracing pipeline 300 executes the closest hit shader for that triangle. If no triangles count as a hit, then the ray tracing pipeline 300 executes the miss shader for the ray.

Operation of the ray tracing pipeline 300 is now discussed with respect to the example rays 1-4 illustrated in FIG. 4. For each of the example rays 1-4, the ray tracing pipeline 300 determines which triangles those rays intersect. The ray tracing pipeline 300 executes appropriate any hit shaders 306 and/or intersection shaders 307, as specified by the materials of the intersected triangles, in order to determine the closest hit that does not miss (and thus the closest-hit triangle). The ray tracing pipeline 300 runs the closest hit shader for that closest-hit triangle.

In an example, for ray 1, the ray racing pipeline 300 runs the closest hit shader for $O_4$ unless that triangle had an any hit shader or intersection shader that, when executed, indicated that ray 1 did not hit that triangle. In that situation, the ray tracing pipeline 300 would run the closest hit shader for $O_1$ unless that triangle had an any hit shader or intersection shader indicating that triangle was not hit by ray 1, and in that situation, the ray tracing pipeline 300 would execute a miss shader 312 for ray 1. Similar operations would occur for rays 2, 3, and 4. For ray 2, the ray tracing pipeline 300 determines that intersections occur with $O_2$ and $O_4$, executes an any hit and/or an intersection shader for those triangles if specified by the material, and runs the appropriate closest hit or miss shader. For rays 3 and 4, the ray tracing pipeline 300 determines intersections as shown (ray 3 intersects $O_3$ and $O_7$ and ray 4 intersects $O_5$ and $O_6$), executes appropriate any hit and an/or intersection shaders, and executes appropriate closest hit or miss shaders based on the results of the any hit and/or intersection shaders.

As described above, when two objects in a scene are the same, the same bounding volume hierarchy tree can be reused to represent both objects, avoiding the time and power consumed to create a new tree for the second object. In some cases, however, two objects in a scene are similar, but different. That is, both objects have shared data (i.e., data representing the same structure) but also have data representing a difference (i.e., difference data) between them. An object can change (e.g., a portion of the object is removed, a portion of the object is altered, a new portion is added to the object) as the scene progresses (e.g., from one image to the next), resulting in the object being similar but different objects. Alternatively, two objects in the same image can be similar but different.

For example, a door in a scene may receive bullet holes as the scene progresses such that the door has no bullet holes at a first point in time during the scene (e.g., a first image), then has bullet holes at a subsequent point in time (e.g., a subsequent image) in the scene. In this case, the doors represents similar but different objects. Although the doors include a shared data representing the same structure, because the doors also have data representing a difference (i.e., difference data) between them at different points in time, conventional ray tracing techniques treat the doors as different objects. Accordingly, the data for each node in a second bounding volume hierarchy tree is built (i.e., created) for the second door which includes storing the data for the groups of triangles (i.e., nodes) and individual triangles representing the structure shared by both objects (i.e., shared data) as well as the data for the nodes and triangles not shared by both objects (i.e., difference data), despite that the shared data was previously stored in memory during the building of a base tree hierarchy tree for the first object, resulting in inefficient use of resources (e.g., additional memory) to store duplicate data.

Features of the present disclosure provide efficient ray tracing techniques, using bounding volume hierarchy trees, for rendering similar but different objects in a scene. Features of the present disclosure determine a shared structure (i.e., shared data) and differences (i.e., difference data) between a base hierarchy tree (i.e., representing a first object) and a second tree (i.e., representing a second similar but different object) by overlaying the base and second trees. For the base tree, the data representing each node is stored. For the second tree (i.e., the second object), the difference data of the nodes are stored, but the remaining data (i.e., the shared data) is not stored. Instead, the previously stored data from the base tree is used to represent the shared data, avoiding the cost of reserving additional memory to store duplicate data. In addition, information (e.g., a single bit) is stored at a node indicating whether to continue traversing the overlay tree to determine whether difference data is present (e.g. at a child node).

Figure 5:
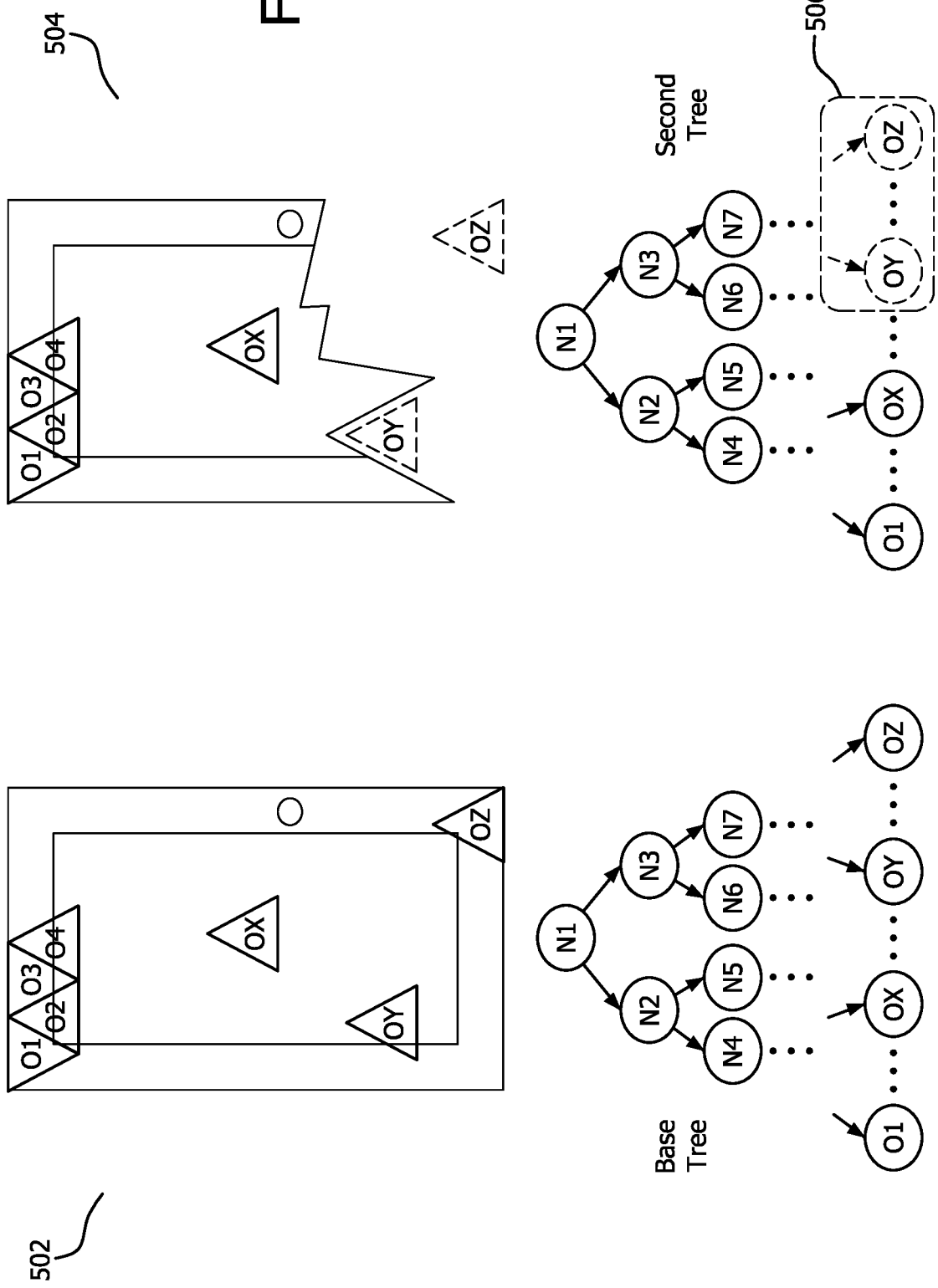
FIG. 5 is an illustration of two similar but different objects and their example corresponding hierarchy trees according to an example.

FIG. 5 is an illustration of two similar but different objects and example corresponding bounding volume hierarchy trees (i.e., a Base Tree and a Second Tree, respectively) according to an example. In the example illustrated in FIG. 5, first and second objects are represented as a first door 502 (shown on the left side of FIG. 5) and a second door 504 (shown on the right side of FIG. 5). Features of the present disclosure can be implemented, however, for any similar but different objects in a scene.

As shown in FIG. 5, a plurality of triangles, including triangles O1, O2, O3, O4, OX, OY and OZ are used to represent the first door 502 in an image of a scene. A plurality of triangles, including triangles O1, O2, O3, O4 and OX are used to represent the second door in the scene. As shown in FIG. 5, a top portion of door 504 remains the same as door 502. However, a bottom portion of door 504 is missing and represents the difference between the two doors 502 and 504. Accordingly, the second door 504 does not have triangles, which include triangles OY and OZ, representing the bottom portion of the door 504. For simplified explanation purposes, the triangles shown in FIG. 5 comprise merely a portion of the triangles used to represent doors 502 and 504 and other triangles of both doors 502 and 504 are omitted (i.e. not shown). In addition, the size, shape and location of the triangles shown in FIG. 5 is merely an example. Features of the present disclosure can be implemented for objects having different types, numbers, sizes, and locations different from those shown in FIG. 5.

As further shown in FIG. 5, a base tree (i.e., a base bounding volume hierarchy tree) is built, as part of an example ray tracing procedure such as a procedure described above with regard to FIGS. 3 and 4. A second hierarchy tree (i.e., a second bounding volume hierarchy tree) is built, as part of an example ray tracing procedure such as a procedure described above with regard to FIGS. 3 and 4 For simplified explanation purposes, the nodes and the number of hierarchy levels shown in FIG. 5 comprise merely a portion of the nodes and levels used to represent doors 502 and 504 and other nodes and levels are omitted (i.e. not shown). Features of the present disclosure can be implemented using any number of nodes and any number of levels for implement a racing tracing procedure for an object. In addition, FIG. 5 illustrates two similar but different objects to be rendered. Features of the present disclosure can be implemented for any number of similar but different objects to be rendered.

Figure 6:
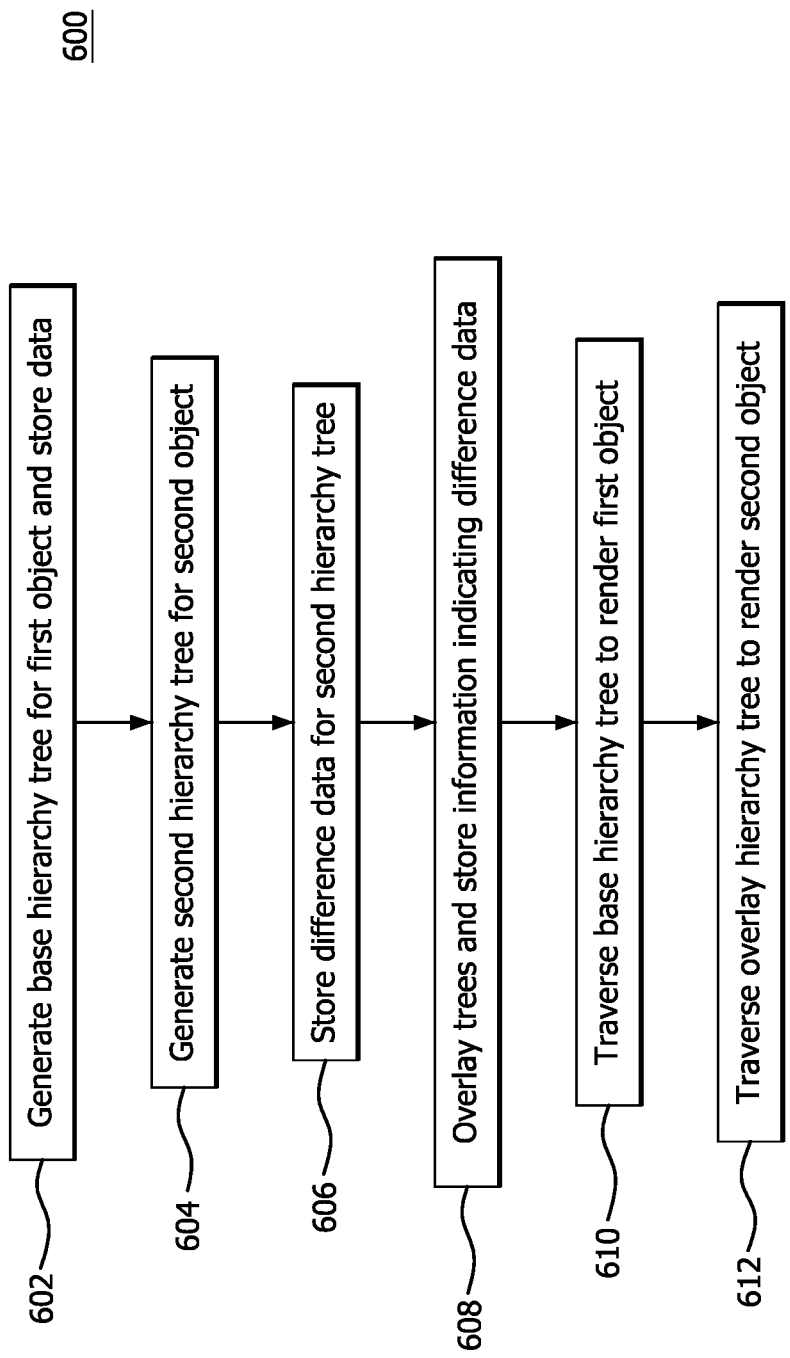
FIG. 6 is a flow diagram illustrating an example method of performing ray tracing operations to render similar but different objects in a scene according to features of the disclosure.

FIG. 6 is a flow diagram illustrating an example method 600 of performing ray tracing operations to render similar but different objects in a scene. The method shown in FIG. 6 can also be thought of as two separate methods. That is, blocks 602-608 illustrate a method of building hierarchy trees for similar but different objects and storing data and indications of difference data prior to rendering the objects. Blocks 610-618 illustrate a method of rendering the similar but different objects in the scene using the stored data and indications of the difference data. For simplification and clarity, both methods are illustrated and described together as method 600 in FIG. 6.

The example method 600 is now described along with the example doors 502 and 504 and their corresponding hierarchy tress shown in FIG. 5.

As shown in block 602 in FIG. 6, a bounding volume base hierarchy tree (i.e., base tree) is generated for the first door 502 and the data for the nodes of the base tree is stored in memory. For example, the first level of the base hierarchy tree is represented as the first node N1 and includes, for example, each of the triangles (e.g., triangle O1 to triangle OZ) representing the first door 502. Because there is hit (i.e., an object is detected) for the first node N1, the testing proceeds to the second level. In the second level of the hierarchy (i.e., nodes N2 and N3), a number of triangles (e.g., triangles representing the top of the first door 502 including triangle O1, O2, O3, O4 . . . OX) are grouped by a bounding box for the second node N2 and a number of triangles (e.g., triangle representing the bottom of the first door 502 including the triangle adjacent OX . . . OY . . . OZ . . . the last triangle at the bottom of the first door 502) are grouped by a bounding box for the third node N3. In this example, there is a hit for both nodes N2 and N3, so the testing proceeds to the next level and so on. In the last level of the base tree, there is a hit for each of the individual triangles representing the first door 502, including the triangle OY and the last triangle OZ at the bottom of the first door 502.

The data corresponding to each of the nodes representing the first door 502 is stored in memory. That is, the data for node O1 to node OZ, including the indications of hits (i.e., presence of the triangles representing the first door 502), is stored in memory.

As shown at block 604 in FIG. 6, a second hierarchy tree (i.e., a second bounding volume hierarchy tree) is built for a second object. For example, the second hierarchy tree shown in FIG. 5 is built for the second door 504. The first level of the second hierarchy tree is represented as the first node N1 and includes, for example, each of the triangles representing the second door 504. Because the bottom portion of the second door 504 is missing, the triangles in the first node N1 of the second tree do not comprise the triangles representing the bottom of the first door 502 which include triangle O1 and triangle OZ.

Because there is hit (i.e., an object is detected) for the first node N1, the testing proceeds to the second level. Similar to the procedure of the first hierarchy tree, in the second level of the hierarchy (i.e., nodes N2 and N3), a number of triangles representing the top of the first door 502 are grouped by a bounding box for the second node N2 and a number of triangles (e.g., triangle representing the bottom of the first door 502 are grouped by a bounding box for the third node N3. At some point during testing, misses occur at nodes (e.g., node OY to node OZ) in the second tree indicating corresponding triangles (e.g., triangle OY and triangle OZ) missing from the second tree that exist for the first tree. These missing nodes are shown by dashed lines and encapsulated in box 506 in FIG. 5.

As shown at block 606, the data for the nodes (e.g., nodes OY to node OZ) and triangles (e.g., triangle OY and triangle OZ) not shared by both objects (i.e., the difference data) is stored for the second tree. But the previously stored data for the first object representing the shared data (e.g., data corresponding to triangles O1, O2, O3, O4 . . . OX) is not stored, avoiding the cost of reserving additional memory to store duplicate data.

As shown at block 608 in FIG. 6, the base tree and the second tree are overlaid to provide an overlay tree and information indicating the difference data is stored for the overlay tree. For example, the base tree corresponding to the first door 502 and the second tree corresponding to the second door 504 are overlaid to provide an overlay tree. The overlay tree includes the nodes (e.g., O1, O2, O3 and OX) comprising the stored shared data and the nodes (e.g., OY and OZ) comprising the stored difference data. The overlay tree also includes information, which indicates the nodes where the difference data occurs, is also stored in memory. That is, at nodes in which one or more child nodes include difference data, information indicating the difference is stored. The indication information at each node is, for example, 1 bit of data (e.g., value of "1"). For example, when the base tree and the second tree shown in FIG. 5 are overlaid, the difference data is determined to be the nodes OY to OZ shown in box 506. The indication information is stored at one or more parent nodes (i.e., nodes at a higher level) of the nodes shown in box 506.

As shown at block 610, the base hierarchy tree is traversed to render first object. For example, at runtime, the first door 502 is rendered using the stored data from each of the nodes of the base hierarchy tree shown in FIG. 5.

As shown at block 612, the overlay tree (the hierarchy tree the base tree and the second tree) is traversed to render second object. For example, at runtime, the second door 502 is rendered using the information indicating where (i.e., which nodes) the difference data occurs is stored in memory and the stored difference data. For example, the nodes of the overlay tree are traversed beginning with the first level (i.e., Node 1, then node 2, then node 3 and so on).

FIG. 7 is a flow diagram illustrating an example method 700 of traversing an overlay tree shown in block 612.

The traversal of the overlay tree starts at block 702. For each node being traversed (i.e., the current node), the data is loaded (e.g., the previously stored data is accessed from memory and loaded to registers) at block 704 to process the data for the node.

As shown at decision block 706, a determination is made as to whether the current node of the overlay tree being traversed includes information (e.g., 1 bit of data) indicating that child nodes of the current node include difference data (i.e., whether a difference is indicated). When the current node of the overlay tree does include the information indicating that one or more of its child nodes include difference data (YES decision), the difference data (e.g., of the child node) is loaded, at block 708 and processed at block 710.

Then, depending on the mode used (e.g., occluded mode or closest hit mode), a decision is made at block 712 to continue traversing the overlay tree or abort traversal. For example, traversal is aborted when an occluded mode is used. Alternatively, when a closest hit mode is used, traversal continues to other nodes in which an object is detected (e.g., if a ray hits both the first and second group). If it is determined to continue traversal, the method proceeds back to block 706.

When the current node of the overlay tree does not include information indicating that one or more of its child nodes include difference data (NO decision), the node is processed at block 710 without loading any difference data. Then, if there are any more nodes to be traversed which comprise the shared data, a decision is made at block 712 to continue traversing the nodes comprising the shared data. When the traversal is ended, the results (resulting data) of the traversal are reported, at block 714, to a processor and the object is rendered.

Accordingly, by storing the bit of data indicating whether or not there is difference data, the processor can decide which data to use, and avoid duplicate storing of shared data. As can be appreciated, small changes in very complex objects can lead to very large amounts of duplicate data which can be saved by storing only the differences.

While traversing the overlay tree, when a node includes information indicating difference data, the processor accesses the difference data at an address in memory. Various techniques can be used to store the difference data and indicate the address to the processor. For example, when the processor accesses the data for a node at an address, and the data for that node includes the indication (e.g., data bit) that there is difference data, the difference data can be stored at a next address in memory subsequent to the address that includes the indication of the difference data or, alternatively, the next subsequent address can include a pointer pointing to a memory address which includes the difference data. In another example, the address that includes the indication of the difference data can be mapped by a hash function to an address in memory.

The methods shown in FIG. 6 and FIG. 7 can also be used to render additional objects that are similar to but different from the first object. For example, if a third door (not shown) in the scene is similar to but different from the first door 502 (and different from the second door), the methods shown in FIG. 6 and FIG. 7 can be performed to render a third object, except that a third hierarchy tree is generated (i.e., built) for the third object and overlaid with the base hierarchy tree to provide the overlay tree.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   memory; and
   a processor configured to perform operations stored in the memory to:
   generate a base hierarchy tree representing a first object comprising data;
   store the data representing the first object in the memory;
   generate a second hierarchy tree representing a second object comprising shared data of the base hierarchy tree and the second hierarchy tree and difference data;
   store the difference data in the memory without storing the shared data; and
   generate an overlay hierarchy tree comprising the shared data, the difference data, and indication information indicating nodes of the overlay hierarchy tree that comprise the difference data.

2. The processing device of claim 1, wherein the processor is further configured to perform operations stored in the memory to:
   traverse nodes of the base hierarchy tree and render the first object using the data stored for the base hierarchy tree; and
   traverse nodes of the overlay hierarchy tree and render the second object using any one or a combination of the shared data, the difference data, and the indication information.

3. The processing device of claim 1, wherein the processor is further configured to perform operations stored in the memory to:
   determine whether a node of the overlay hierarchy tree comprises the indication information that indicates one or more child nodes of the node include the difference data.

4. The processing device of claim 3, wherein the processor is further configured to perform operations stored in the memory to:
   access the difference data of the one or more child nodes to render the second object when the node includes the indication information.

5. The processing device of claim 3, wherein the processor is further configured to perform operations stored in the memory to:
   traverse nodes of the overlay hierarchy tree comprising the shared data when the node does not include the indication information.

6. The processing device of claim 3, wherein the processor is further configured to perform operations stored in the memory to:
   when the node includes the indication information access the difference data at a next address in memory subsequent to a memory address that includes the indication information when the node includes the indication information.

7. The processing device of claim 3, wherein the processor is further configured to perform operations stored in the memory to:
   access the difference data at a second memory address via a pointer in a next address in memory that is subsequent to a first memory address that includes the indication information when the node includes the indication information.

8. The processing device of claim 3, wherein the processor is further configured to perform operations stored in the memory to:
   map a memory address that includes the indication information to a second memory address via a hash function when the node includes the indication information; and
   access the difference data at the second memory address.

9. The processing device of claim 1, wherein the difference data represents a difference between the first object and the second object.

10. The processing device of claim 1, wherein the difference data represents a difference between the base hierarchy tree and the second hierarchy tree.

11. A method for performing rendering comprising:
    generating a base hierarchy tree representing a first object comprising data;
    storing the data representing the first object;
    generating a second hierarchy tree representing a second object comprising shared data of the base hierarchy tree and the second hierarchy tree and difference data;
    storing the difference data without storing the shared data; and
    generating an overlay hierarchy tree comprising the shared data, the difference data, and indication information indicating nodes of the overlay hierarchy tree that comprise the difference data.

12. The method of claim 11, further comprising:
    traversing nodes of the base hierarchy tree and rendering the first object using the data stored for the base hierarchy tree; and
    traversing nodes of the overlay hierarchy tree and rendering the second object using any one or a combination of the shared data, the difference data, and the indication information.

13. The method of claim 11, further comprising:
    determining whether a node of the overlay hierarchy tree comprises the indication information that indicates one or more child nodes of the node include the difference data.

14. The method of claim 13, further comprising:
    accessing the difference data of the one or more child nodes to render the second object when the node includes the indication information.

15. The method of claim 13, further comprising:
    traversing nodes of the overlay hierarchy tree comprising the shared data when the node does not include the indication information.

16. The method of claim 13, further comprising:
    accessing the difference data at a next address in memory subsequent to a memory address that includes the indication information.

17. The method of claim 13, further comprising:
    accessing the difference data at a second memory address via a pointer in a next address in memory that is subsequent to a first memory address that includes the indication information when the node include the indication information.

18. The method of claim 13, further comprising:
    mapping a memory address that includes the indication information to a second memory address via a hash function; and
    accessing the difference data at the second memory address when the node includes the indication information.

19. The method of claim 11, wherein the difference data represents a difference between the first object and the second object.

20. The method of claim 11, wherein the difference data represents a difference between the base hierarchy tree and the second hierarchy tree.

* * * * *